April 28, 1936.　　　　D. S. BRAY　　　　2,038,534
METHOD OF MAKING HEELS
Filed July 25, 1933　　　7 Sheets-Sheet 1

April 28, 1936.  D. S. BRAY  2,038,534
METHOD OF MAKING HEELS
Filed July 25, 1933  7 Sheets-Sheet 2

Inventor
DANA S. BRAY
by David Rines
Attorney

April 28, 1936. D. S. BRAY 2,038,534
METHOD OF MAKING HEELS
Filed July 25, 1933 7 Sheets-Sheet 3

Inventor
DANA S. BRAY
by Dans Rines
Attorney

April 28, 1936.  D. S. BRAY  2,038,534
METHOD OF MAKING HEELS
Filed July 25, 1933   7 Sheets-Sheet 4

Inventor
DANA S. BRAY
by David Rines
Attorney

April 28, 1936.   D. S. BRAY   2,038,534
METHOD OF MAKING HEELS
Filed July 25, 1933   7 Sheets-Sheet 5

Inventor
DANA S. BRAY
by David Rines
Attorney

Inventor
DANA S. BRAY
by David Rines
Attorney

April 28, 1936.   D. S. BRAY   2,038,534
METHOD OF MAKING HEELS
Filed July 25, 1933   7 Sheets-Sheet 7

Inventor
DANA S. BRAY
by David Rines
Attorney

Patented Apr. 28, 1936

2,038,534

UNITED STATES PATENT OFFICE 2,038,534

METHOD OF MAKING HEELS

Dana Spencer Bray, Orleans, Vt., assignor of one-half to Alfred H. Paradis, Montreal, Ontario, Canada Application July 25, 1933, Serial No. 682,080

13 Claims. (Cl. 12—147)

The present invention relates to methods of making heels, and more particularly wood heels.

According to present-day methods of manufacturing wood heels, a wood-heel block is first grooved at the breast and its sides are then turned. The grooving of the breast of the heel is usually effected by a machine in which the blocks are carried, heel-seat down, into and past a rapidly rotating, breast-grooving cutter. The cutter is so shaped, and the path of travel of the blocks past the cutter is such, that the resulting groove in the breast is transversely curved in cross section from the heel seat to the tread. It is after this grooving operation that the sides of the heel are turned. In the case of Louis or French heels, the breast-grooving operation is executed by cutting along a path transverse to the heel breast, and leaves a projecting shank. It is necessary, after the turning, therefore, to scour or otherwise finish this shank. The shank is sometimes formed or shaped simultaneously with the grooving of the breast, both in a single operation, in which event further scouring may usually be dispensed with. This is economical both in time and labor. It has always been considered heretofore important, however, to perform the turning after the breast-grooving. This is principally because, as the grain of the wood usually extends longitudinally of the heel block, from the back line to the breast, and as the before-described breast-grooving cutter rotates in a direction perpendicular to the grain of the wood, this breast-grooving cutter splinters or breaks or chips the wood out at the side where it leaves the heel block. The subsequent turning operation usually removes this broken or chipped surface, but such removal would be impossible if the heel were turned prior to the breast grooving.

There are many disadvantages in being compelled to breast-groove before turning, particularly in those cases when, as before described, the breast grooving is accompanied by the simultaneous formation or shaping of the shank, both in a single operation. In the first place, the breast-grooving cutter must cut through a greater thickness of the wood before turning than after, and this results in the necessity for using heavier cutters and more massive and powerful heel-block clamps, besides the waste of power necessary to operate these more ponderous mechanisms. Secondly, unless the previously grooved-and-shank-scoured block is exactly centered before turning, the shank of the heel will not be symmetrical, being thicker at one end than the other; and to center the blocks accurately means an expenditure of time and effort. Thirdly, the shank of the heel thus produced is usually too long and of irregular length, so that it must be trimmed or cut to the correct length, thereby involving still further cost of manufacture. There are also other disadvantages mentioned hereinafter.

It has accordingly been proposed to turn the block before breast grooving. One such proposal has involved the expedient, in order to prevent the above-described chipping or breaking out the sides of the block by the rapidly rotating, breast-grooving cutters, of using two separate cutters, respectively rotating from each side of the block inward toward the center. All such prior-art proposals have involved equally inefficient, complicated and unwieldy methods. None of them has proved practicable, so that it is still the universal rule to groove the breast of the heel prior to turning.

An object of the present invention is to improve upon present-day methods of and machines for making heels, with the ends in view of producing more accurately formed heels, reducing substantially the percentage of waste, and using more simple, lighter, and inexpensive machinery, operated easily and conveniently, with less power, by the most unskilled operators, thus saving expense in time, labor and money.

A further object is to provide a new and improved method of cutting articles and, in particular, of grooving heel breasts.

To the attainment of these ends, a feature of the invention resides in turning the heel before grooving the breast, the subsequent breast-grooving being effected in a single operation by a single, suitably designed, breast-grooving cutter. This may be effected in many different ways within the scope of the invention. According to the preferred embodiment of the invention that is illustrated and described herein, where the grooving cutter cuts outwardly along the breast, such cutting, in order to prevent breaking or chipping out at the heel breast, is effected by cutter blades that operate with a drawing shear cut. The shank may, and preferably is, formed or shaped simultaneously with the breast, so as to eliminate any subsequent scouring operation. For simplicity, therefore, and to conform to current usage, this shank-forming operation will hereinafter be referred to as a shank-scouring operation.

If preferred, the number of cutter blades may be sufficiently increased, and the speed of operation may be so regulated, that the wood shall be cut from the breast in the form of successive wood-dust particles, thus further tending to prevent the said breakage or chipping. It is furthermore possible to turn the heel blocks by a single, continuous turning operation, from one side of the heel breast to the other side of the heel breast, because the portion of the breast of the heel block thus chipped or broken out by the turning cutter will be removed by the subsequent breast-grooving operation. Such continuous turning operation has previously been proposed as subsequent to, instead of following, the breast-grooving operation, but this has been impracticable, because causing chipping or breaking out in the already grooved breast of the heel block, and there is no way to reclaim a heel block the breast of which, after grooving, becomes thus damaged. Such considerations do not, however, enter according to the present invention, because the chipped or otherwise damaged breast of the heel block is removed in the final, breast-grooving operation.

As the turning is effected before the grooving, the heel block is placed in the turning machine in rough-sawn form, just after it leaves the blocking-out saws. There is no smooth, previously formed breast, therefore, to be used for gaging purposes, as is the practice with present-day methods.

Another object, therefore, is to provide a novel gage for use with a turning machine.

As the rough-sawed, ungrooved breast of the block, moreover, is not always at the same inclination to the heel seat of the block at the time that the block reaches the turning machine, this gage, by engaging the rough breasts of the successive heel blocks, will cause the heel blocks to assume somewhat different positions in the clamp or jack of the turning machine, thereby causing the turning machine to produce differently inclined side contours in the successive heel blocks.

A further object of the invention, therefore, is to minimize the effects thereby produced, and, to this end, a further feature of the invention resides in engaging all heel blocks in the turning machine at the same point, as near to the heel seat as practicable. As the variations in inclination of the breasts of the successive heel blocks is of the smallest extent at such a point, the variations in the inclinations of the turned sides of the various heel blocks are reduced to a minimum.

A further object is to grade the heel blocks, or to cut off portions to provide their tread faces, to produce uniformity, between the turning and the grooving operations.

Still another object is to gage the heel blocks at very nearly the same point during all the operations of turning, grading and grooving, thus introducing a minimum of irregularity in the final product caused by the fact that it is necessary to gage from the rough-sawed breasts of the heel blocks.

Other and further objects will be explained hereinafter, and will be particularly pointed out in the appended claims.

The invention will now be described in connection with the accompanying drawings, in which.

Figures 1, 2, 3, 4, 5, 6, 7:
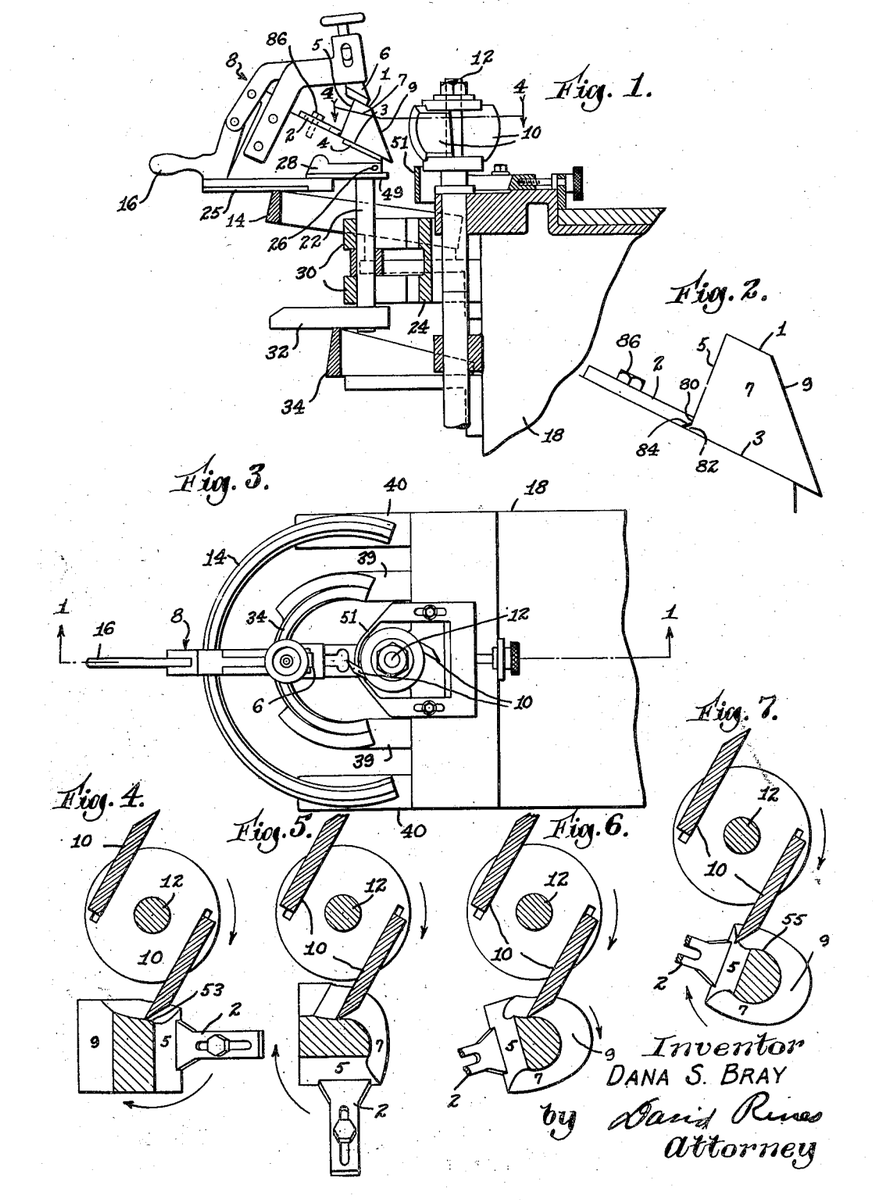
Fig. 1 is a vertical, longitudinal section of a preferred heel-turning machine for performing a preferred turning step according to the present invention, the section being taken upon the line 1—1 of Fig. 3, looking in the direction of the arrows.
Fig. 2 is a view of a detail.
Fig. 3 is a plan of the machine shown in Fig. 1.
Fig. 4 is a horizontal section, upon a larger scale, taken upon the line 4—4 of Fig. 1, looking downward in the direction of the arrows, the heel block being shown just after the commencement of the turning operation.
Figs. 5, 6 and 7 are views similar to Fig. 4, showing subsequent steps in the turning operation.

A rough-sawed, wood-heel block is shown in Figs. 1, 2 and 3 provided with a tread face 1, a heel-seat face 3, a breast 5, extending usually at an angle to the direction of the grain of the wood, and side faces 7 that extend upward from the tread face 1 toward the heel-seat face 3. The inclined, middle back line of the heel is shown at 9. The heel block is thus trapezoidal, as viewed from the side, Figs. 1 and 2. The breast 5 may be at right angles to the oppositely disposed, tread and heel-seat faces 1 and 3, or it may be, as it usually is, inclined thereto. Heel blocks of this character may be produced by sawing strips of lumber into suitable shapes.

According to the present invention, the first step is to turn the sides 7 of this block. This may be effected in any desired, well-known manner, as by means of the two-cutter, wood-heel turning machines in common use. These comprise a wood-heel-block jack or holder or clamp, such as is shown at 8 in Figs. 1 and 2, that is adapted to swing along an upper, U-shaped, curved track, like the track 14, about two formed, rotary cutters to present different portions of the heel blank to the cutters. The grain of the wood usually extends longitudinally of the heel, from the breast 5 to the back line 9, so that if the cutters were to cut from one side 53 of the breast 5, inward into the wood and around to the middle line 9 of the back of the heel, and continuously on to the other side 55 of the breast, the cutter would break or chip out the breast at the side 55. To prevent this, according to the present-day practice, one of the cutters shapes one side of the heel block, from the breast 5 to the middle line 9 of the back of the heel, and the other cutter performs a like operation for the other side of the heel block.

There are two disadvantages, among others, to turning in this manner. First, the two side, turning cuts thus produced do not usually merge smoothly at the back line 9, so that a further abrading operation, usually with a sandpaper or emery wheel, is necessary. Secondly, it requires additional time and labor to perform these successive operations.

According to the preferred embodiment of the present invention, therefore, the turning is effected in a single operation. A preferred turning machine, illustrated in Figs. 1 to 7, will now be described.

The wood-heel block is shown clamped in these views between lower and upper jaws 4 and 6 of the heel jack. A breast gage 2 engages the breast 5 properly to position the block on the lower jaw 4. The wood-heel block is subjected to the action of cutter blades 10 mounted upon a single spindle 12 that rotates rapidly about a vertical axis. Different portions of this wood block are presented to the cutter blades 10 by the jack 8, as the latter is swung over the curved track 14 by means of a handle 16, grasped by the operator. To this end, the jack 8 is linked to the base or frame 18 of the machine, about a vertically disposed pivotal rod or shaft 22, by a link bracket 24. As the curve of the track 14 does not lie in a horizontal plane, as will be understood more particularly from Fig. 1, provision is made for tilting the jack 8 about a horizontal pivot pin 26. The tilting movement, up and down, is effected automatically, by and against the force of gravity, by a shoe 25 that is carried by the jack 8. The shoe 25 engages the track 14 at its outer end to support the jack 8 on the track, and rides on the track as the jack is swung by the operator into and out of operative relation to the cutter blades 10. The pivot pin 26 is carried by a U-shaped arm 28 that extends out from the upper end of the rod 22. The jaw 4 is pivoted about the pin 26 between the arms of the U. As the rod 22 is vertically and rotatably movable in bearings 30, at the free end of the horizontally swinging link bracket 24, the pivot pin 26 is also vertically movable, with the result that a vertical tilting movement, about the upper end of the rod 22, is imparted to the jack 8, during its swinging movement over the track 14. The vertical movement of the rod 22 is effected by an arm 32, that is mounted at the lower end of the rod 22 to ride over, and be supported upon, a second curved track 34. The jack 8 thus swings horizontally about the cutter blades 10, and rises and falls vertically by reason of the action of the arm 32 on the track 34, and tilts vertically about the pivot 26, in order to enable the cutter blades 10 to turn the sides of the heel block into proper shapes. During the swinging and vertical movements of the jack about the cutters 10, a guide or former cam 49 engages a guard 51, provided in front of the cutter spindle 12, and moves about the guard, in engagement therewith. The shape of the guide cam 49 corresponds, in general, to the outline of the base of the heel. The tracks 14 and 34 are shown mounted upon brackets 40 and 39, respectively, that are adjustably secured vertically to the frame 18.

As the clamp 8 is swung along the track 14 about the cutter blades 10, the track 34 causes the pivotal point 26 to rise and fall, and the track 14 causes the shoe 25 to rise and fall. The resulting movement, in connection with the shape of the cutter blades 10, determines the turned shape of the resulting heel. Different shapes may be obtained by using differently shaped cutter blades 10 and by varying or adjusting, slidably or pivotally or both, the tracks 14 and 34. Pivotal adjustment of the upper track 14 effects a variation in the pitch of the heel at the back line 9.

To obtain a heel of the desired contour, therefore, the cutter blades 10 having first been chosen of the proper shape, the bracket 40 is first vertically adjusted to the proper height, and the track 14 to the inclination suitable for the required pitch of the back line 9 of the heel. The lower track 39 properly shaped and inclined is then vertically adjusted to make the heel blank 2 come in contact with the cutters in proper vertical relation. To obtain a heel of different pitch, the inclination of the upper track is changed, as before stated.

Not only is a turning machine of this character simpler in construction and less expensive than the two-spindle machines before mentioned, but it performs the turning of the heels more rapidly, and in a single operation. The workman first presents one side 53 of the breast 5 of the heel to the cutter blades 10, as illustrated in Fig. 4, then turns the jack 8 through the successive positions illustrated in Figs. 5 to 7, to effect turning of the heel in a single operation. At the other side 55 of the breast 5 of the heel, to be sure, the cutter blades will break away or chip the breast 5 of the heel. This, however, is no disadvantage because, owing to the fact that, according to the present invention, the heel block is grooved after turning, it is possible to turn the block without regard to whether the turning operation does or does not break or chip the block. It is therefore possible to turn the block continuously in a single direction, as the broken-out or chipped or otherwise damaged part of the block thus produced at the breast 5, near the side 55, will be removed in the subsequent grooving operation. The back line 9, on the other hand, is smooth and requires no smoothing operation with an abrasive; and the time consumed in the turning is very much less than with the two-spindle-turning machines.

Figures 8, 9, 10:
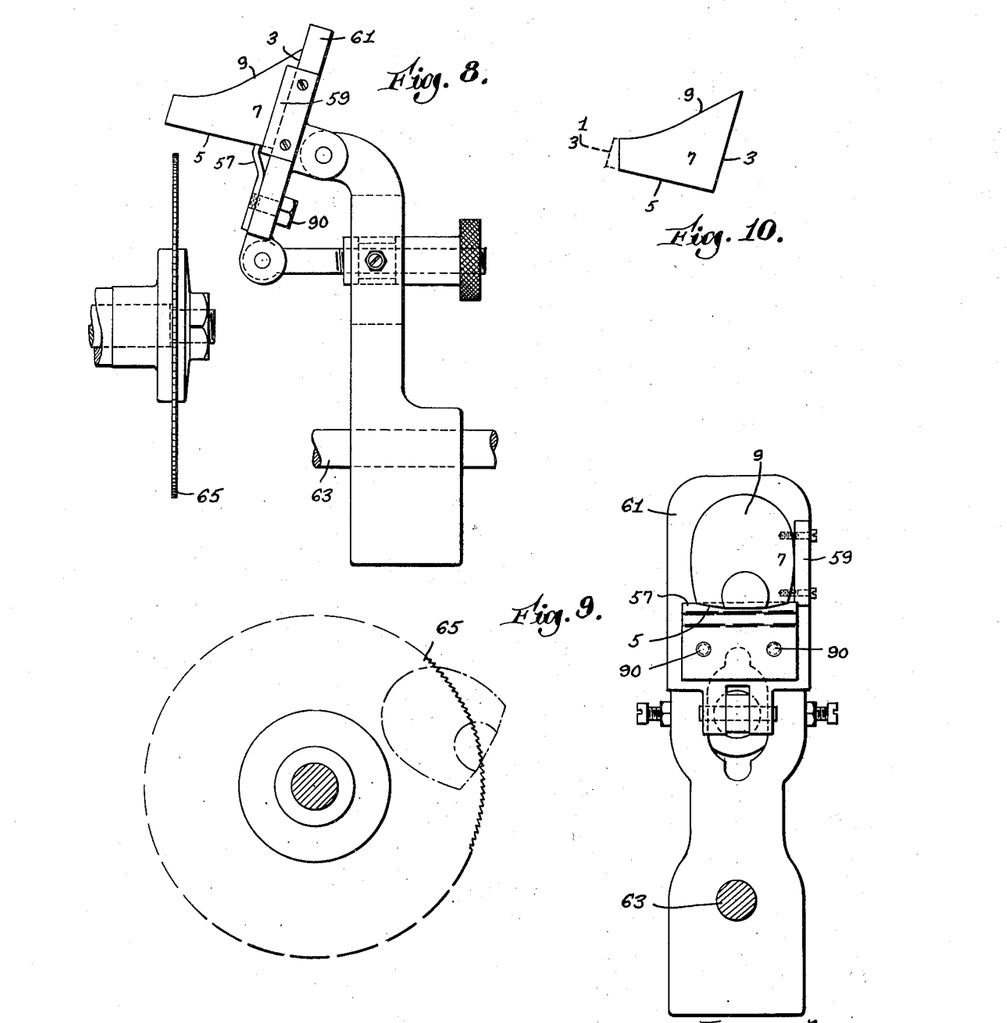
Fig. 8 is a side elevation of a preferred heel-grading machine.
Fig. 9 is a front elevation of the same.
Fig. 10 is an elevation of a turned heel, before the combined grooving-and-shank-forming operation, showing, in dotted lines, its shape before grading.

By whatever method the block is turned, however, it will have the appearance shown in Fig. 8. The next step, according to the present invention, is to grade the block, so as to remove the dotted-line, tread portion of the block, shown in Fig. 10. This is effected by holding the block steady against two gages 57 and 59, as shown in Figs. 8 and 9, the former in engagement with the breast 5 and the latter in engagement with the side 7 of the block. The heel seat 3 is held flat against a plate 61 that is pivotally mounted upon an axis 63. The operator swings the plate 61 about the axis 63, towards the left, as viewed in Fig. 9, to cause the block to engage a rotating saw 65.

Figure 11:
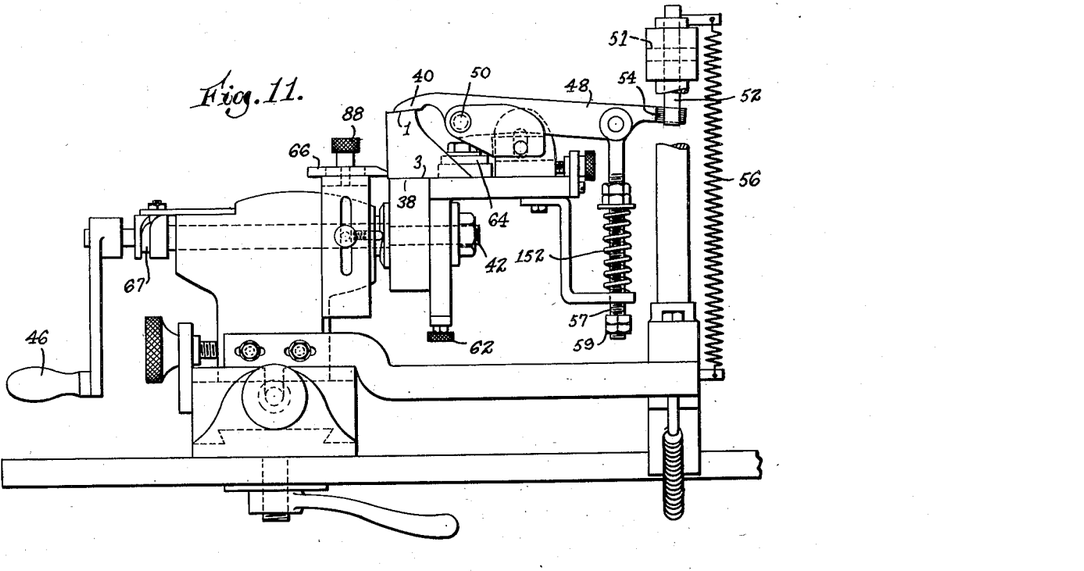
Fig. 11 is an elevation of a preferred grooving-and-shank-forming machine.
Figure 16:
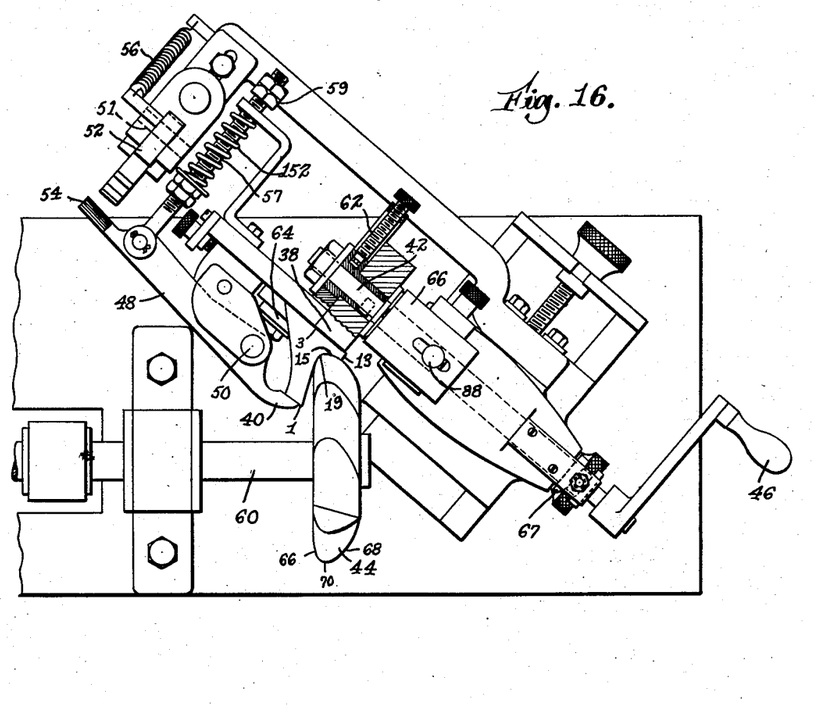
Fig. 16 is a plan corresponding to Fig. 14, with the parts in different positions.

A turned and graded block, of the shape shown, for example, in full lines in Fig. 10, may now be placed manually by the operator in a jack, between jaws 38 and 40 of a heel-block clamp, of a combined - grooving - and - shank - scouring machine, as illustrated in Figs. 11 and 16.

The grading, previous to the next operation of grooving and shank scouring, is of some importance, because ensuring that all heels shall be of the proper height to be received between the jaws 38 and 40.

The jack is pivotally mounted to rock back and forth about a horizontally disposed shaft 42, or it may be effected by automatic mechanism which may, if desired, cause the block-holding clamp or clamps 38, 40 to rotate in a single direction throughout, instead of being returned by a reverse movement to their initial position. This pivotal movement of the jack may be effected by means of a handle 46. The jaws 38 and 40 are caused to engage the heel-seat 3 and the tread face 1, respectively, of the heel block to effect a more secure clamping action than might be the case if the heel were clamped at its sides.

Figure 14:
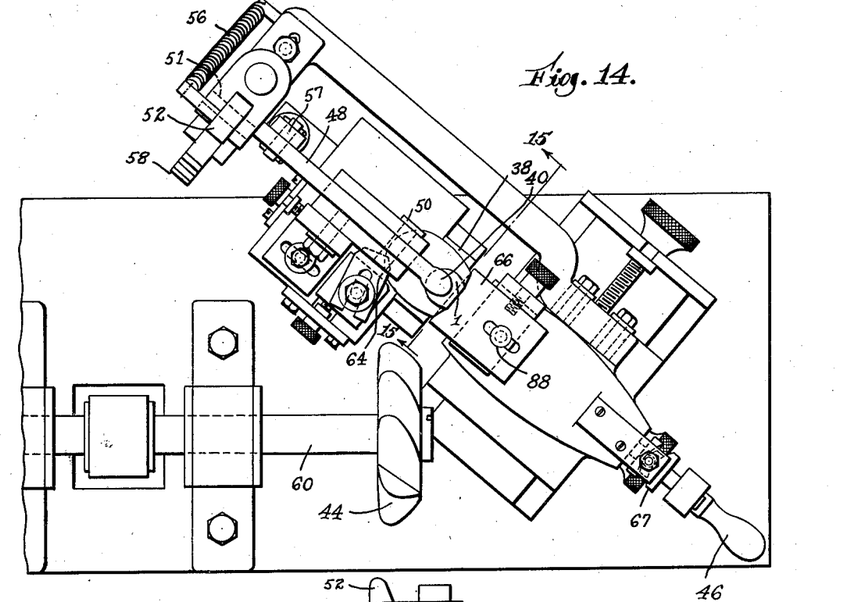
Fig. 14 is a plan of the grooving-and-shank-forming machine illustrated in Fig. 11.
Figure 15:
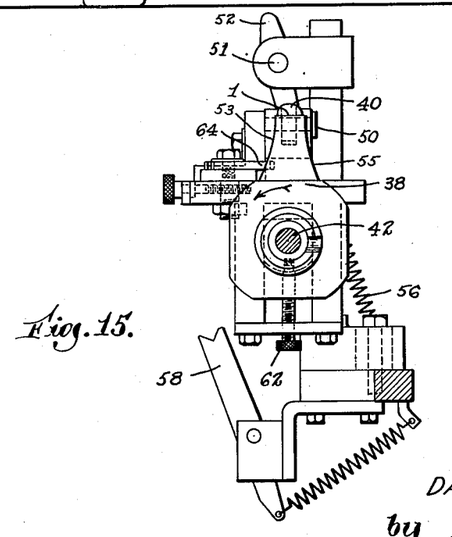
Fig. 15 is a vertical section of the same taken upon the line 15—15 of Fig. 14, looking in the direction of the arrows.

According to the preferred construction, so as to present the heel block to a rapidly rotating grooving-and-shank-scouring cutter 44 (Figs. 14 to 29) or 78 (Fig. 30), the jaw 40 is normally ineffective when the jack occupies its initial position, to one side of the cutter 44. It is, however, caused to close in against the heel tread face 1 automatically when the jack is pivotally actuated or rocked by the operator, about the horizontally disposed shaft 42, in the direction of the arrow, Fig. 15, from the initial position of Fig. 14 toward the position of Fig. 16. This will be understood from the following description.

The jaw 40 is mounted at the forward end of a lever 48 that is intermediately pivoted at 50. The pivot 50 may be adjustable, as shown. The lever 48 is biased by a spring 152 to cause the jaw 40 to engage the heel top. The spring 152 is mounted about a rod 57 that may be adjusted by a nut 59 to accommodate heel blocks of different height from heel seat 3 to heel tread face 1, as fixed by the adjustment of the grading machine, illustrated in Figures 8 and 9. The rear end 54 of the lever 48 is, however, normally engaged by a catch 52, to raise the jaw 40 at the time when the jack occupies its said initial position. The catch 52 is pivoted at 51 so as to swing to the right and to the left of a dead-center position about this pivot 51, as illustrated in Figures 12 and 13, and is maintained in a position to one side of its dead-center position, when the jack occupies its said initial position, by a spring 56, as shown in Fig. 12.

Figures 12, 13:
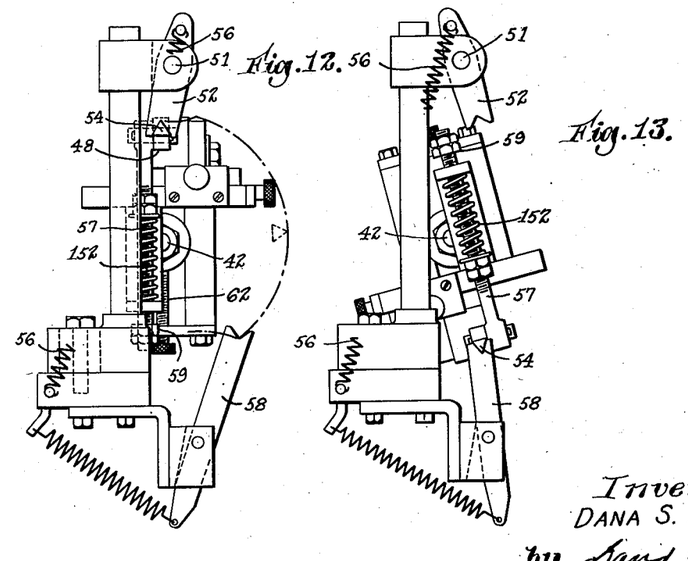
Figs. 12 and 13 are elevations of the same, looking from the right, the parts being shown in different positions.

As soon as the jack is swung slightly by the handle 46 about the shaft 42, the catch 52 is forced, in opposition to the force exerted by the spring 56, to swing to the position illustrated in Figure 13, thereby releasing its grip upon the rear portion 54 of the lever 48, and permitting the spring 52 to cause the jaw 40 to snap down upon the heel tread face 1, as illustrated in Fig. 11. If, therefore, the heel was properly positioned centrally on the jaw 38 when the jack occupied its said initial position, it will now be maintained in properly centered position as the jack is swung further by the handle 46, to cause the heel block to travel into and past the cutter 44. The initial centering of the heel block upon the jaw 38, prior to the clamping down of the jaw 40, is effected by a side gage plate 64 and a breast gage 66, the former engaging a side of the block and the latter the breast 5. The side gage plate 64 rests permanently on the jaw 38, in contact with the side of the heel, during the grooving-and-shank-scouring operation. The breast gage 66, however, is adjustably carried on a stationary part of the machine, and engages the breast 5 momentarily, just before the jaw 40 descends on the heel top, whereupon a cam 67 moves the jaws 38 and 40, the support therefor, and the heel carried thereby, longitudinally away from the breast gage 66. This is not described in further detail, because forming no part of the present invention. As the block travels past the cutter 44, the latter grooves and shank-scours the breast thereof, as will presently be described. On reaching the other side of the cutter 44, the jaw 40 is automatically raised again, by a similarly operating catch 58, to release the now grooved-and-shank-scoured block. The block, thus released, thereupon falls into a receptacle (not shown) below, whereupon the handle 46 is manipulated to return the jack to its initial position. The jaw 48 thereupon becomes automatically raised again by the catch 52, the operator places a new heel block between the jaws 38 and 40, and the jack is again swung by the handle 46 to repeat the grooving-and-shank-scouring operation.

Figure 17:
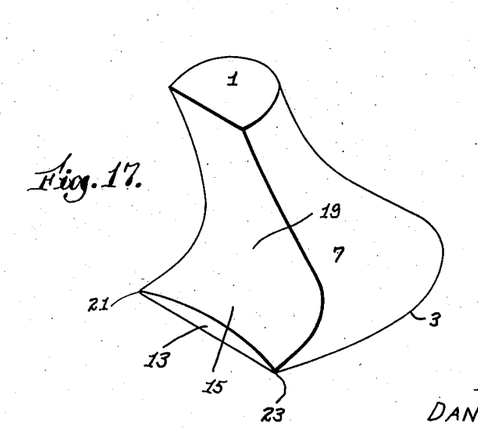
Fig. 17 is a perspective of a turned, wood-heel block, graded and grooved and shank-formed, produced in accordance with the present invention and by the illustrative machines.

The mechanism for actuating the jaw 40 into clamping engagement against the block is thus such as to cause the block to become clamped firmly at its top and heel-seat portions before the breast-grooving operation, to remain held clamped as firmly during the travel of the block into and past the cutter 44, and to permit the block to become readily released when the operator desires to have the block drop out from between the jaws 38 and 40, after it has become grooved. Proper adjustment of the side gage plate 64 will ensure proper centering of the heel, so that the shank 13 shall have the same thickness at its ends 21 and 23 (Fig. 17).

The cutter 44 is mounted upon a rotatable shaft 60, inclined to the shaft 42, and is thus rotated in a plane at an angle to the plane of pivotal or rocking movement of the jack. The cutter 44 is so shaped, and the path of movement of the heel block on the jack is so designed, that a grooved surface 19 (Fig. 17) of any desired, preferably concave, shape shall be cut in the breast 5 of the block. The stationary jaw 38 is so positioned relative to the cutter 44 that, when it occupies the position shown in Fig. 16, it shall be nearer to the shaft 42 than are the outermost portions of the blades of the cutter 44. A portion 13 of the block, near the heel-seat portion 3, therefore, will remain uncut, leaving a projecting lip or shoulder or shank. Owing to the circular nature of the path of travel of the clamp jaws 38 and 40, the shank 13 will be shaped or scoured convexly at 15, simultaneously with the breast-grooving operation, in a single operation. It is essential that the thickness at the two ends 21 and 23 of the shank 13 shall be the same, else the heel is rejectable as "off-center". The attainment of this end has been one of the difficulties of wood-heel manufacture that, as explained hereinafter, is overcome in very simple fashion according to the present invention.

Provision is made for adjusting both the radius of the convex surface 15 and the thickness of the shank 13. The thickness of the shank 13 is adjusted by varying the distance of the heel seat 3 from the cutter 44, as by adjusting the jaws 38 and 40 vertically, as a unit, with the shaft 42, as by means of a screw 62. The convexity of the surface 15 is adjusted by lengthening or shortening the radius of the arc of travel of the block; that is, by adjusting the relative distance between the shafts 42 and 60. The length of the shank or lip 13 may be adjusted by the breast gage 66, the adjustment of which is more fully described hereinafter, with a more important function. The angular position of the block, both on the jaw 48 and the jaw 38, may be adjusted, in any desired manner, to predetermine both the inclination of the turned contour and the breast groove.

The blades of the cutter 44 are so shaped, and the path of their entering into the heel block is such, that they always cut the breast 5 in one of two ways: either by cutting into the block from the side 53 or 55; or, if they cut away from the block, then it is done with arcuate drawing shear cuts. In fact, it is preferred to shear even at those times when the blades cut into the block. The operation will be described in greater detail presently. As the cutter blades at no time cut their way transversely out of the block, against the grain of the wood, therefore, the wood of the block is never chipped or broken away. It is for this reason that it is possible to effect the turning of the block prior to its grooving. If the grooving effected such chipping or breaking, the block would be irrevocably destroyed.

Figures 18, 19, 20, 21, 22, 23:
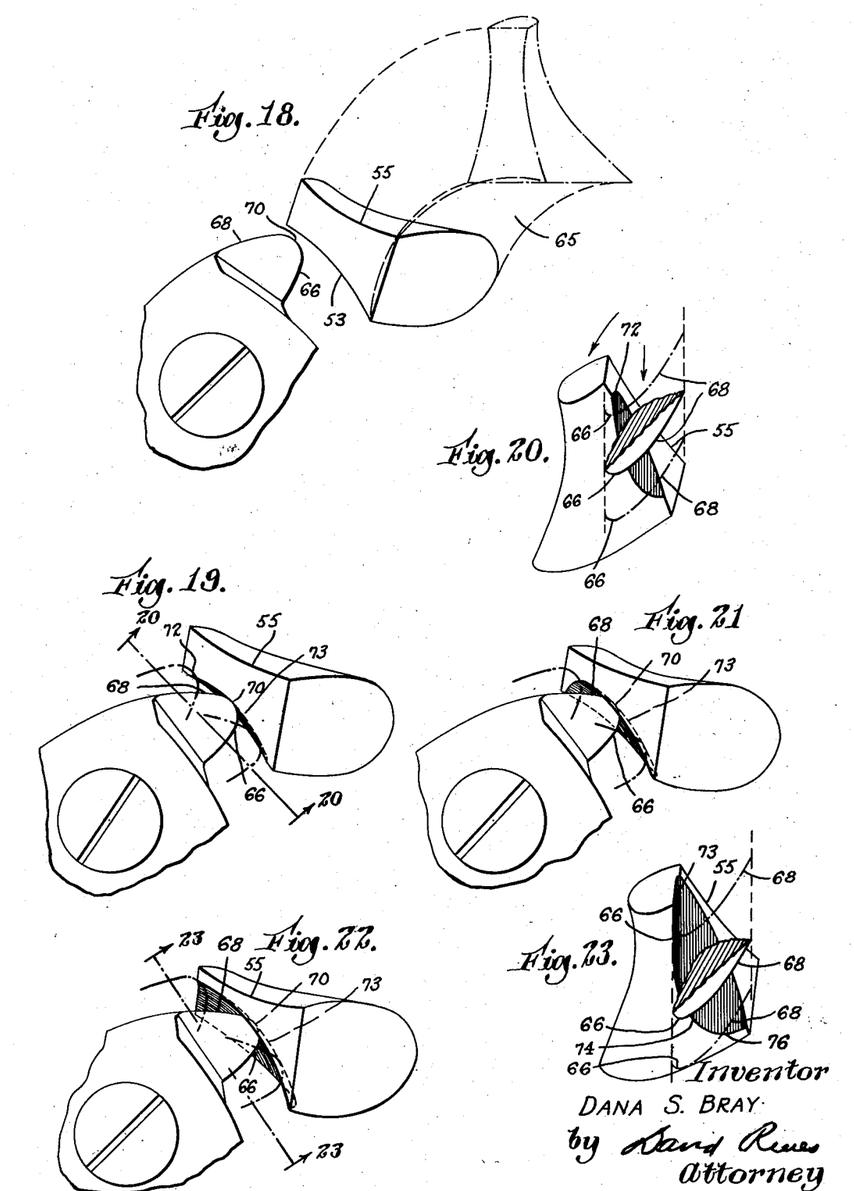
Fig. 18 is a diagrammatic view showing a wood-heel block after the turning and grading operations, and about to be subjected to the said grooving-and-shank-scouring operation in the machine illustrated in Figs. 11 to 16, the heel being shown by dot-and-dash lines in its initial position, and in full lines as it is about to be moved into the grooving-and-shank-scouring cutter.
Fig. 19 is a similar view, after the cutter has engaged the heel-block breast, showing one position of the cutter in full lines and previous and subsequent positions in dot-and-dash lines.
Fig. 20 is a section taken upon the line 20—20 of Fig. 19, looking in the direction of the arrows.
Figs. 21 and 22 are views similar to Fig. 18, illustrating further steps of the grooving-and-shank-scouring operation.
Fig. 23 is a section taken upon the line 23—23 of Fig. 22, looking in the direction of the arrows.
Figure 24:
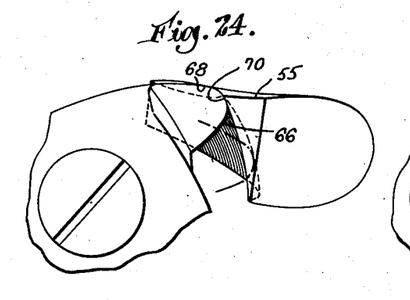
Figs. 24, 25 and 26 are views similar to Figs. 19, 21 and 23 illustrating still further steps of the grooving-and-shank-scouring operation.
Figure 25:
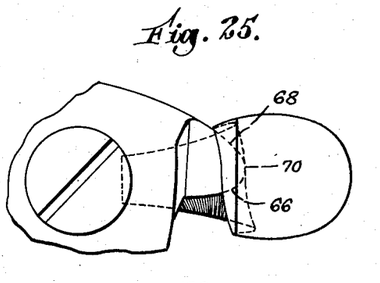
Figure 26:
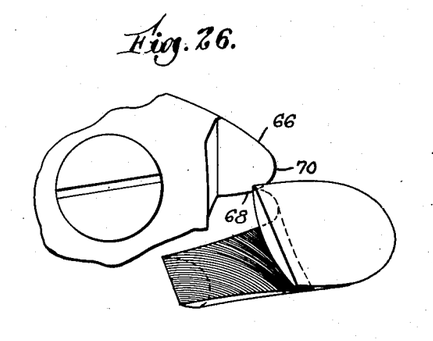
Figure 27:
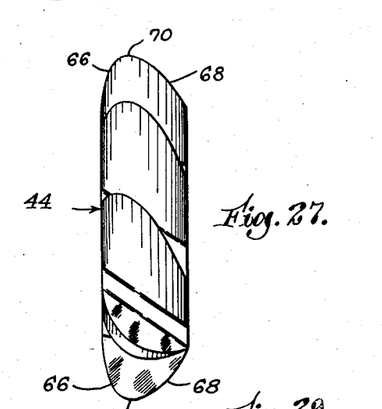
Figs. 27, 28 and 29 are respectively a plan, a front elevation and a rear elevation of a preferred grooving-and-shank-scouring cutter.

The manner of cutting the breast will be understood from Figs. 18 to 26. As is clear from Figs. 27 to 29, more particularly, the cutter blades each have a curved contour, and are disposed at an angle to the shaft 60, upon which the cutter 44 is mounted, and to the direction of its rotation, so as to produce the draw-shear cuts hereinafter more fully described. Each cutter blade is provided with a part 66 of relatively small curvature, and a part 68 of larger curvature, the parts 66 and 68 merging gradually into each other at 70. In Fig. 18, the heel block is shown in its initial position by dot-and-dash lines, as having traveled along the path 65, and as about to enter into the cutter in the full-line position. The block has actually entered into the cutter in the position illustrated by Fig. 19. The part 66 first cuts shearingly into a portion of the breast of the heel near one extreme corner thereof, at the side 53, as shown at 72, Figs. 19 and 20, where three successive positions of the cutter blades are illustrated in dot-and-dash and full lines. As the cutter 44 and the block continue to turn toward each other, the portion 66 cuts lower and lower down on the edge of the breast, as shown at 73 in Fig. 19 and in Figs. 21 to 23, always with a draw-shearing cut. This draw-shearing cut continues to about the point 74, after which the part 70 and the part 68, of greater curvature of the blade, begin to shear the shank of the heel, as at 76. As the cutter extends further into the heel block, it cuts deeper, as illustrated by the successive Figs. 19 to 23, until it cuts entirely through the opposite side 55 of the heel block, as shown in Fig. 24. It does not, however, cut tranversely outward at the said opposite side 55 of the heel block; on the contrary, it cuts inward into the heel, at the side 55, always with a draw-shearing cut, as from the full-line to the dot-and-dash line positions of Fig. 24. The portion 68 of the cutter continues to cut inward into the side 55 of the heel, in this manner, throughout along the complete side 55 of the heel, from near the tread face 1 of the heel to near the heel seat 3, until the shank portion 13 is reached. At this time, the portion 66 of the cutter 44 is again effective, as shown in Fig. 26. At no time is it possible for the cutter to cut outward of the heel against the grain, as it is always shearing into the wood, throughout the length of the side 55 of the heel block, when the cutter is leaving the end side 55 of the heel block, as well as when it is entering the heel block at the side 53.

The nature of the striations produced in the grooved breast, as illustrated, for example, in Fig. 26, indicates that the inward shear cut is of arcuate form and extends continuously from the tread face 1 to the heel seat 3.

Figures 28, 30:
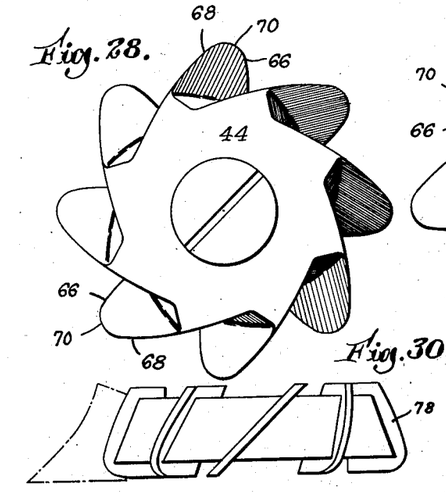
Fig. 30 is a view illustrating a modified cutter.
Figure 29:
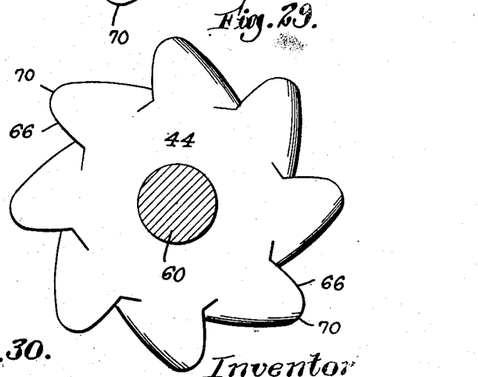

It is not essential that the grooving-and-shank-scouring cutter be exactly of the shape illustrated at 44, for other shear cutters may also be employed, such as the cutter 78 illustrated, for example, in Fig. 30. The blades of this cutter 78, too, are disposed at an angle to the shaft 60 upon which the cutter 78 is mounted, and to the direction of its rotation, and likewise cut into the block with a shear cut. A 45-degree angle is found to operate very well, in practice, in both cases, the actual shear being produced at angles varying between 45 degrees and 135 degrees. The cutter 78 is of larger dimension than the cutter 44 heretofore described, and the blades thereof approximate more to the shape of the final, resulting, breast groove, as seen from the side of the completed heel, so that it is preferable to have the angle between the cutter shaft 60 and the shaft 42, about which the heel block is swung, more nearly a right angle. Because of constructional considerations, it is found preferable to make the blades of the cutter 78 separate, and to secure them in a cutter head. It is thus possible to use differently shaped blades for differently shaped grooves to be cut in the breast 5. The smaller blades of the cutter 44 may, however, be readily formed integral with their cutter head, as shown, as a wide variety of shapes of breast grooves may be produced with a single, small cutter of this character, merely by adjusting the angle between the shafts 42 and 60 and by means of other adjustments which, though illustrated, are not necessary to describe in detail, because known to persons skilled in the art. As illustrated, the shaft 42 is shown angularly adjustable, but the shaft 60 could be angularly adjusted, instead. The shearing effect produced by the cutter 78 is substantially the same, however, as before described, except that more of the wood is sheared from the tread face 1 to the heel-seat face 3 of the block at each cut. It will be understood, also, that the cutter blades might be caused to enter the heel block at the side 55, instead of at the side 53, in which event the blades might be caused to incline oppositely to their illustrated incline. The illustrated and other shapes of cutter not only produce the above-described, non-chipping effect, but they also provide for breast grooves of all shapes usually met with in practice.

The cutters 44 and 78 have a relatively large number of blades, say, eight or ten, and are rotated at high speed, say, 10,000 revolutions per minute, with the result that, depending upon the speed with which the block is swung past the cutter, so many cuts, say, 750 per heel, are necessarily made into the wood, during the grooving of the breast groove, that the successive layers of cuttings are reduced to very fine, wood-dust particles. Even if there had been any tendency to chipping out the wood, as the cutter blades cut at the further edge 55 of the block, therefore, the effects of such tendency would be minimized by the fact that when such small, wood-dust particles are removed at each cut, the smallest possible amount of strain is produced in the wood by the action of the cutter blades. Owing to this fact, and the shearing angle of the cutter blades, the angle between the shafts 42 and 60 may therefore be made very close to 90 degrees, if desired, under such circumstances.

The breast 5 of the heel block is engaged, during the turning operation, by the breast gage 2 before mentioned, as illustrated in Figs. 1 and 2; during the grading operation, as before stated, by a breast gage 57, illustrated in Figs. 8 and 9; and, when positioned in the jack of the grooving-and-shank-scouring machine, by a breast gage 66. If the breast 5 were exactly at right angles to the heel-seat 3, it would not matter against what points, of the breast 5 of successive heel blocks, these various breast gages 2, 57 and 66 were positioned. The various heel blocks would occupy exactly the same place on the lower jaw 4 of the turning machine, and so would have imparted to them, by the turning machine, the same, identical turned contour. They would likewise occupy precisely the same position on the plate 61 (Figs. 8 and 9) of the grading machine, and so would all have exactly the same, full-line shape illustrated in Fig. 10, after leaving the grading machine. They would similarly all be positioned alike on the lower jaw 38 of the grooving-and-shank-scouring machine, with the result that the breast groove of every heel block grooved and scoured thereby would have the same inclination to the heel seat 3 as every other breast groove of every other heel block, and the convex face 15 (Fig. 17) of all shanks 13 of the completed heel blocks would all have the same slope. As the resulting turned contours, graded tops, breast grooves and shanks would all be formed under like conditions, the blocks would all be perfectly uniform.

But the breasts 5 are seldom exactly at right angles to the heel seat 3; they are usually inclined thereto. Even so, if the inclinations of the breasts 5 were uniform, something of the same, uniform-product effect, before described, might be attained if the breast gages 2, 57 and 66 were each maintained at its same level on its respective machine. Not all heel blocks, however, even after they have been cut from the lumber strips with apparent uniformity, have exactly the same inclination of the breast 5 to the heel-seat 3. If, therefore, the breast 5 of one heel block were engaged by the breast gage 2 at one position, this would result in a contour being turned in the side of the heel at a different angle to the heel-seat 3 than would be the case when another heel block, of different-breast inclination, were engaged by the breast gage 2 at the same position. The same would be true of the grading and the breast-grooving operations, though the effect of an improperly inclined heel tread face 1 produced by the grading machine would not be nearly so marked as in the breast-grooving machine. The higher up on the breast 5, toward the heel tread face 1, that the breast gage 66 of the breast-grooving machine would engage the breast 5, the greater would be the variation in the inclinations of the resulting breast groove and of the convex surface 15 of the shank 13. In order to minimize the effects that would be produced by such variation, therefore, the breast gages 2, 37 and 66 are positioned very low down on the breast 5, as near as possible or convenient to the heel seat 3. As before stated, it is not essential that the grading-machine breast gage 57 be as low as the other gages 2 and 66, and it is found convenient, in order to provide for a sufficient hard grip support during the grade-sawing, to have it a little higher on the breast 5, as illustrated in Fig. 8.

All heel blocks are thus gaged from substantially the same low position on the heel breast 5, near the heel seat 3, during the turning, grading and grooving-and-shank-scouring operations. This is rendered possible by the fact that this breast surface 5 is the last to be removed. If the length of the heel seat 3 is the same in the different heel blocks, the size of the tread face 1 will also be the same, and the same will be true of the turned contour, the breast groove and the shank 13.

The breast gage 2 shown in Figs. 1 and 2 has a gaging face 80 that extends substantially throughout the thickness of the gage, unlike the case of the breast gage 66. The turning-machine, breast gage 2 remains in contact with the breast 5 throughout the turning operation, while the grooving-and-shank-scouring gage 66, as before stated, engages the breast 5 for but a short interval of time, just prior to the moment when the jaw 48 grips the heel top. The rough-sawed blocks, however, often have a projecting burr 82 at the junction between the heel seat 3 and the breast 5, produced by the rough-sawing operation. In order not to lose the advantage of a firm breast-gaging action on the turning machine, therefore, the full width of the gaging face 80 is retained to effect the gaging, except that the gage is cut away, or has a space provided, at 84, at the lower edge corner of the gage 2, to receive the projecting burr 82. The height of the space 84 need not be very great,—say of the order of one-fourth inch.

In operation, the positions of the breast gages 2 and 66 (and also, if desired, of the grading breast gage 57) will be initially adjusted longitudinally to correspond to the inclination of the breast 5 to the heel seat 3 of a particular run of heel blocks. This may be effected by means of clamping screws 86 (Figs. 1 and 2) and 88 (Fig. 11) and 90 (Fig. 8) and cooperating elongated openings in which they are mounted. Accidental variations in the inclination of the breast 5 to the previously fixed inclination will thus be compensated for, as before explained.

No attempt is made herein to illustrate or describe the many changes and modifications that may be made within the spirit and scope of the invention. Such modifications and changes will readily occur to persons skilled in the art. It will therefore be understood that the machines illustrated and described herein are illustrative only, and that the invention is not restricted thereto, but is defined by the appended claims. It is intended to cover in the appended claims all the novelty that the invention may possess, and it is therefore desired that the claims be broadly construed, except insofar as it may be necessary to impose limitations because of prior art.

What is claimed is:

1. A method of making heels that comprises first shaping the back of the heel and then shearing the breast of the heel with a drawing shear cut to form a breast groove.

2. A method of making heels that comprises first shaping the back of the heel and then cutting inwardly into one side of the heel along the breast and into the other side of the heel along the breast, one of the said cuts being a drawing shear cut that shears along the said other side of the heel at the breast to form a breast groove.

3. A method of making heels that comprises first shaping the back of the heel and then cutting the breast and the shank of the heel with a drawing shearing cut.

4. A method of making heels that comprises first shaping the back of the heel and then cutting successive small layers from the breast of the heel in the form of dust particles from the tread face of the heel to near the heel seat by arcuate cuts to form a breast groove and a scoured shank.

5. A method of making heels that comprises first shaping the back of the heel and then cutting inwardly into one side of the heel along the breast and into the other side of the heel along the breast with a cut that shears along one side of the heel at the breast from the tread face of the heel to near the heel seat by arcuate shear cuts to form a breast groove and a scoured shank.

6. A method of making heels that comprises first shaping the back of the heel, centering the shaped heel, clamping the centered heel, and cutting successive small layers from the breast of the heel from the tread face of the heel to near the heel seat by arcuate shear cuts to form a breast groove and a scoured shank.

7. A method of making heels that comprises first shaping the back of the heel, engaging a predetermined portion of the breast of the heel to gage the heel for the shaping thereof, centering the shaped heel, clamping the centered heel, cutting successive small layers from the breast of the heel from the tread face of the heel to near the heel seat by arcuate shear cuts to form a breast groove and a scoured shank, and gaging the heel at the said portion of the breast for forming the breast groove.

8. A method of making heels that comprises first shaping the back of the heel and then cutting inwardly into one side of the heel along the breast and into the other side of the heel along the breast by a progressive, continuous, cutting operation.

9. A method of making heels that comprises first shaping the back of the heel and then cutting along the breast inwardly and outwardly into one side of the heel and inwardly into the opposite side of the heel, the outward cut being a drawing shear cut that shears from the tread face of the heel to near the heel seat to form a breast groove.

10. A method of making heels that comprises first shaping the back of the heel and then cutting along the breast inwardly into one side of the heel and outwardly at the other side of the heel, the outward cut being a drawing shear cut that shears along the said other side of the heel at the breast from the tread face of the heel to near the heel seat to form a breast groove.

11. A method of making heels that comprises cutting inwardly into one side of the heel along the breast and into the other side of the heel along the breast with a cut that shears along one side of the heel at the breast from the tread face of the heel to near the heel seat by arcuate shear cuts to form a breast groove and a scoured shank.

12. A method of making heels that comprises first shaping the back of the heel and then simultaneously forming a groove in the breast of the heel and forming a shank thereon with a drawing shear cut.

13. A method of making heels that comprises first shaping the back of the heel and then simultaneously forming a complete groove in the breast of the heel from the tread face of the heel to the shank and forming the shank by removing successive small layers from the breast of the heel in the form of dust particles.

DANA SPENCER BRAY.